United States Patent [19]

Noguchi et al.

[11] 4,123,391

[45] Oct. 31, 1978

[54] AUTO EMISSION PURIFYING CATALYST AND METHOD OF MANUFACTURE

[75] Inventors: Masaaki Noguchi, Nagoya; Tsuchio Bunda, Okazaki, both of Japan

[73] Assignee: Toyota Jidosha Kogyo Kabushiki Kaisha, Aichi, Japan

[21] Appl. No.: 735,785

[22] Filed: Oct. 26, 1976

[30] Foreign Application Priority Data

Oct. 23, 1975 [JP] Japan .......................... 50-127985

[51] Int. Cl.$^2$ .......................... B01J 21/04; B01J 23/44
[52] U.S. Cl. .............................. 252/466 PT; 252/432; 252/455 R; 252/465; 423/213.5
[58] Field of Search .......... 252/466 PT, , 432, 455 R, 252/465; 423/213.5

[56] References Cited

U.S. PATENT DOCUMENTS

| | | | |
|---|---|---|---|
| 3,392,125 | 7/1968 | Kelly et al. | 252/463 X |
| 3,565,830 | 2/1971 | Keith et al. | 252/477 R |
| 3,741,725 | 6/1973 | Graham | 252/466 PT |
| 3,881,696 | 5/1975 | Lepeytre et al. | 252/465 X |
| 3,990,995 | 11/1976 | McArthur | 252/477 R |

*Primary Examiner*—W. J. Shine
*Attorney, Agent, or Firm*—Oblon, Fisher, Spivak, McClelland & Maier

[57] ABSTRACT

An auto emission purification catalyst which comprises palladium supported on a carrier composed mainly of α-alumina having a total porosity volume of 0.05–0.50 cc/g and an average porosity diameter of 0.05–0.5μ.

10 Claims, 4 Drawing Figures

AUTO EMISSION PURIFYING CATALYST AND METHOD OF MANUFACTURE

BACKGROUND OF THE INVENTION

1. Field of the Invention

The present invention relates to an auto emission purification catalyst composed of palladium on an α-alumina support. More particularly, the present invention relates to an auto emission purification catalyst of palladium on an α-alumina carrier having special characteristics which diminish the tendency to oxidize $SO_2$ to $SO_3$ in the exhaust gases while effectively oxidizing unburned hydrocarbons and CO in the exhaust gases.

2. Description of the Prior Art

The gasoline which is normally used in automobiles contains residual sulfur compounds and has a sulfur content of less than 0.05 weight %. The greater portion of these compounds reacts with oxygen in the burning process of the combustible gas-air mixture in the cylinder, thereby forming sulfur dioxide as a pollutant. The sulfur dioxide is expelled from the engine in the exhaust gas and in the process is widely diffused into the atmosphere where it is converted into sulfur trioxide via photochemical reactions. Thereafter, hydrolysis of the $SO_3$ results in sulfuric acid mist which causes severe environmental problems.

In order to meet the ever increasing stringent requirements of auto emission control laws, noble metal based catalyst converters have been used to eliminated unburned hydrocarbons and carbon monoxide from the exhaust gases expelled from vehicles. However, the purification of the exhaust gases in such catalyst converters results in the oxidation of unburned hydrocarbons and carbon monoxide, which promotes the transformation of sulfur dioxide into sulfur trioxide, thereby producing sulfate dust and sulfuric acid mist in the auto exhaust system. Thus, the exhaust gas emissions contain sulfuric acid mist and sulfate dust, and the problem of the catalyst converter-equipped vehicles is how to reduce these sulfur pollutants in the auto emissions.

Alumina, which is the catalyst carrier, reacts with sulfur trioxide when the temperature of the catalyst bed is low and occludes sulfur trioxide, but at high temperatures the occluded sulfur trioxide is released. Thus, while the temperature of the catalyst bed is low when the engine is idled or under low speed running conditions, a large volume of sulfur trioxide is generated. Moreover, the greater portion of the sulfur trioxide generated under these conditions combines with the alumina support yielding $Al_2(SO_4)_3$ which is occluded in the porous structure of the carrier and thus reduces the volume of $SO_3$ discharged from the engine.

The above reaction progresses easily in the vicinity of 420° C., but when the temperature rises to about 700° C., $Al_2(SO_4)_3$ is decomposed. Thus, a large volume of $SO_3$ is produced under low-speed, low-load running conditions when the temperature of the catalyst bed rises, resulting in a sudden release of $SO_3$ in large volume and causes local environmental pollution.

Accordingly, a need continues to exist for a method of reducing the sulfur oxide content of exhaust gases.

SUMMARY OF THE INVENTION

Accordingly, one object of the present invention is to provide a catalyst for an exhaust gas converter which reduces the formation of sulfur oxide pollutants.

Briefly, this object and other objects of the present invention as hereinafter will become more readily apparent can be attained by an auto emission purification catalyst which comprises palladium supported on an α-alumina carrier having a total pore volume of 0.05 – 0.50 cc/g and an average pore diameter of 0.05 – 5.0μ. By using the catalyst of the present invention the harmful components in exhaust gases, i.e., unburned hydrocarbons and carbon monoxide, can be eliminated, while the oxidative conversion of sulfur dioxide in the exhaust gas resulting from the combustion of sulfur in the fuel into $SO_3$ can be prevented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The auto emission purification catalyst of the present invention is palladium metal supported on a carrier composed mainly of α-alumina having a total pore volume of 0.05–5.0 cc/g and an average pore diameter of of 0.05–5.0μ which eliminates the CO and hydrocarbon pollutants of the exhaust gases. Concerning the characteristics of the α-alumina support of the present catalyst, if the average pore diameter of the support is less than 0.05μ, the durability of the purifying characteristics of the catalyst will diminish as a result contamination of the carrier with a specific component in the exhaust gas during use. Furthermore, the initial purification performance of the catalyst is poor. If the average pore diameter of the support exceeds 5μ, the initiation temperature for hydrocarbon (HC) elimination will be greater than 300°–320° C., which is the practical initiation temperature, and as a result, the low temperature purifying performance of the catalyst will deteriorate.

Figure 2:
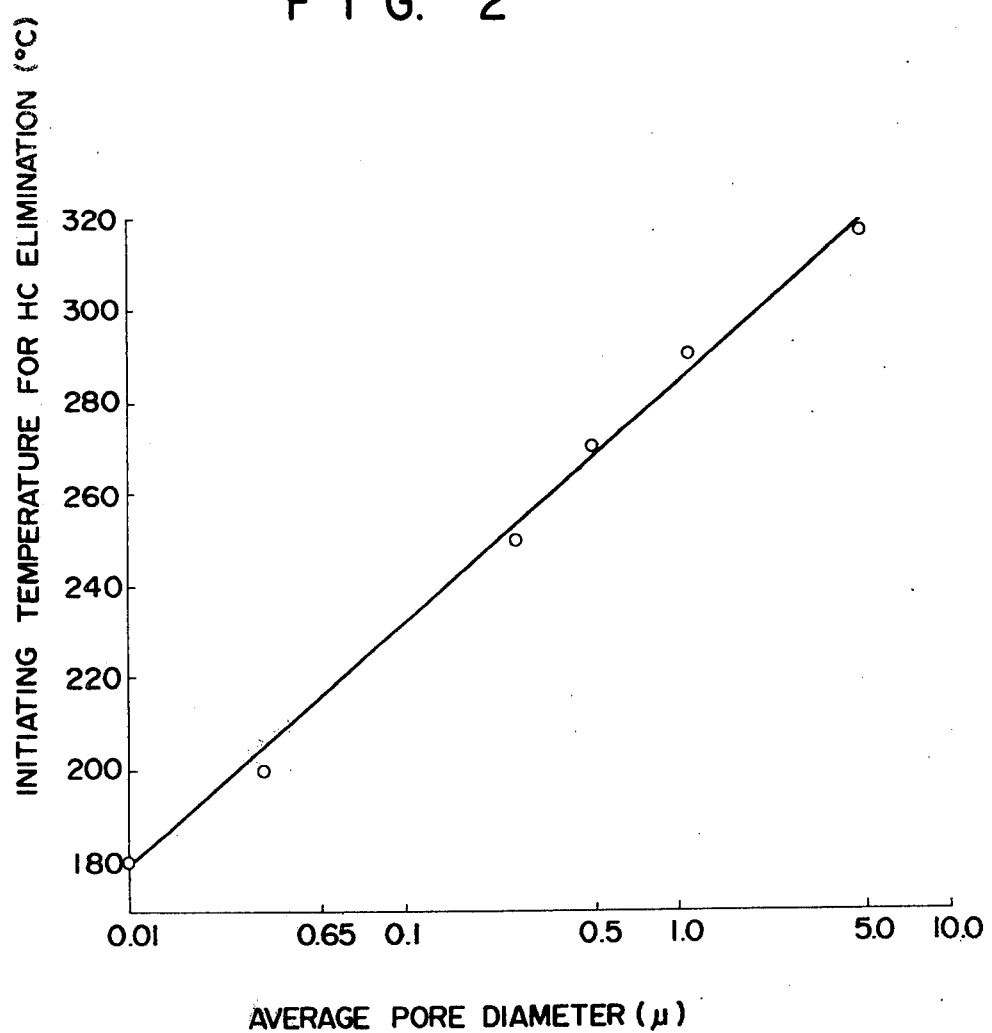
FIG. 2 graphically illustrates the relationship between the average pore diameter of the present catalyst and the initiation temperature for hydrocarbon elimination.

FIG. 2 shows the relationship between the average pore diameter of the initiation temperature for hydrocarbon elimination of a catalyst supported on the carrier. The figure substantiates that the upper limit of the average pore diameter of the support should be less than 5.0μ; and if the value is less than 5.0μ, the necessary initiation temperature for hydrocarbon elimination can be obtained. Thus, the average pore diameter should be specified in the range of 0.05–5.0μ. More desirably from the standpoint of durability and mechanical strength, the pore diameter should be in the range of 0.1 – 2.0μ.

If the pore volume of the support exceeds 0.5 cc/g, the crushing strength will fall below 5 kg/particle, i.e., the practical limit of durability. On the other hand, if the pore volume is less than 0.05 cc/g, the initiation temperature for hydrocarbon elimination will exceed 300°–320° C., which is the practical initiation temperature. This results in deterioration of the low temperature purifying performance of the catalyst.

Figure 3:
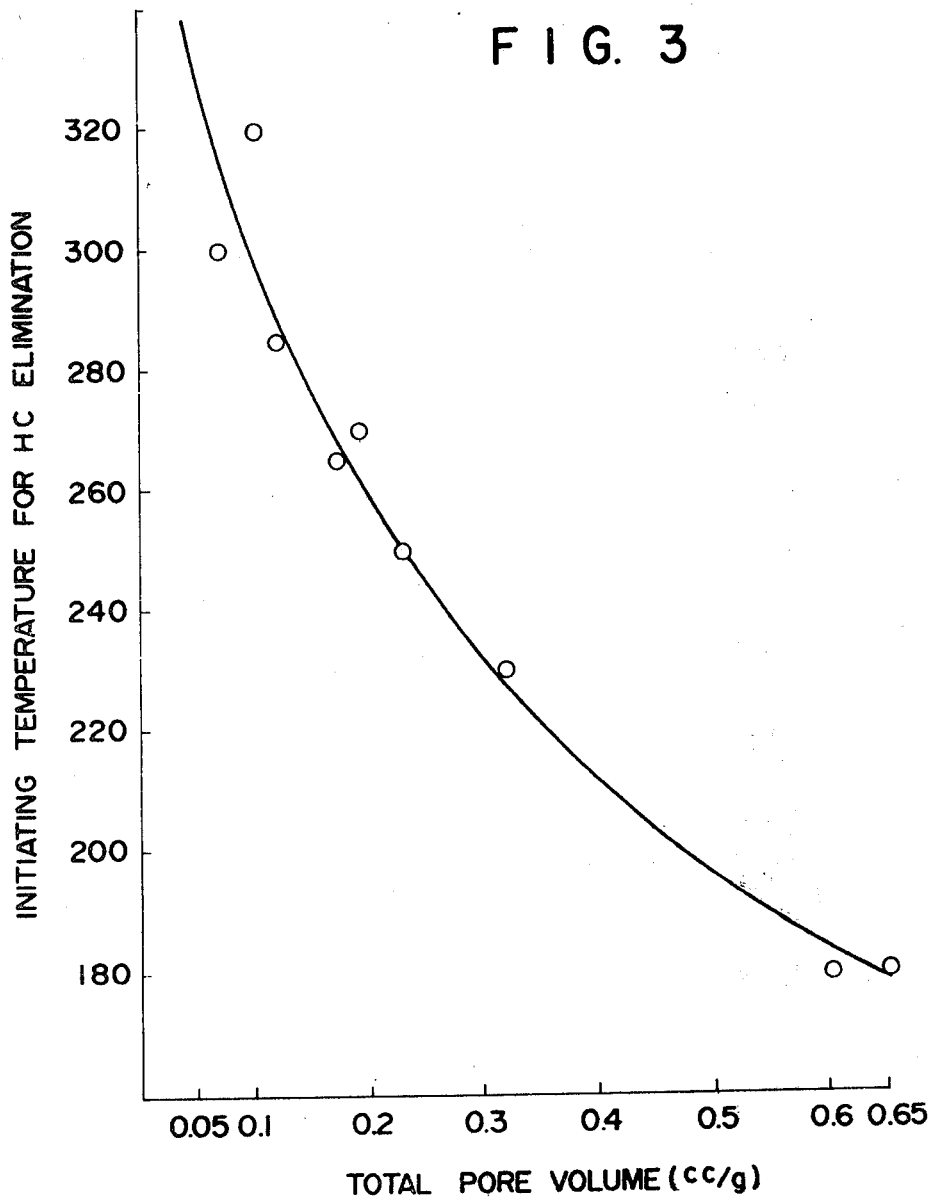
FIG. 3 graphically illustrates the relationship between the total pore volume of the present catalyst and the initiation temperature of hydrocarbon elimination.

FIG. 3 shows the relationship between the total pore volume of the α-alumina carrier and the initiation temperature for hydrocarbon elimination of a catalyst supported on the carrier. In the carrier of the present invention, its crushing strength sharply rises with a decrease in its total pore volume. This is good so far as strength is concerned, but this is achieved at a sacrifice of carrier density which results in a loss of porosity and consequent deterioration of low temperature reactivity. Thus according to FIG. 3, the catalyst, with a decreasing pore volume exhibits an increasing initiation temperature for purification. At a pore volume value of around 0.05 cc/g, the initiation temperature for hydrocarbon elimination will sharply rise, resulting in deterioration of low temperature reactivity. It can be ascertained from the figure that in order to satisfy the above conditions, the total pore volume should be more than 0.05 cc/g.

Figure 4:
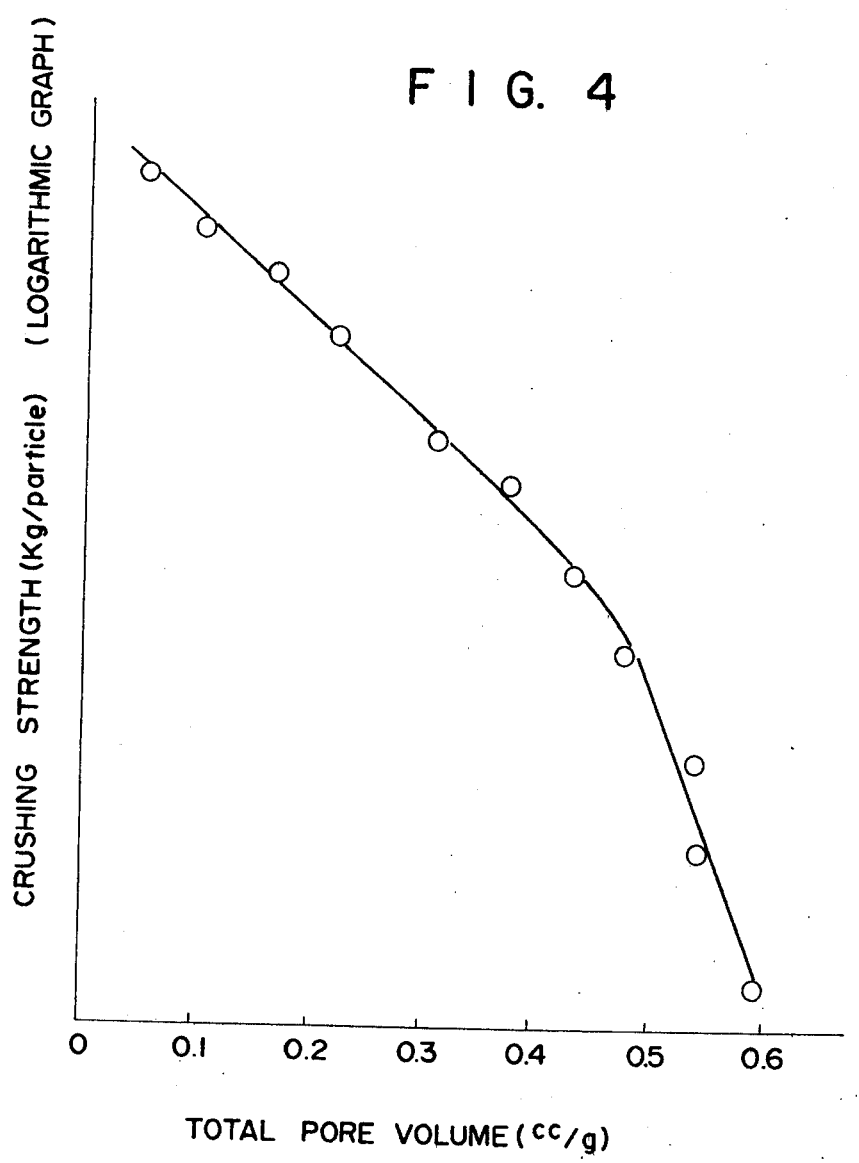
FIG. 4 graphically illustrates the relationship between the total pore volume of the present catalyst carrier and its crushing strength.

FIG. 4 illustrates the relationship between the total pore volume of the α-alumina carrier and its crushing strength. With time lapse in service, the mechanical strength of the auto emission purifying catalyst decreases, and it is liable to break and pulverize. However, no matter what the configuration of the catalyst is, so long as its crushing strength exceeds 5 kg/particle, the catalyst is generally satisfactory for practical purposes in terms of strength, with its loss in volume attributable to breaking and pulverization held to less than 5% in its service period.

As is evident from FIG. 4, with an increase in the total pore volume, the catalyst becomes increasingly porous and its strength decreases. When the total pore volume exceeds 0.5 cc/g, its strength sharply drops. Thus when the total pore volume of the porous carrier is set at a value less than 0.5 cc/g, a sharp drop in the strength can be avoided. This, together with the shape effect can assure the necessary crushing strength for an auto emission purifying catalyst.

As described above, it is practically desirable to set the total pore volume of the catalyst carrier in the range of 0.5–0.5 cc/g to allow for satisfactory purifying performance and mechanical strength characteristics of the catalyst. A more preferred range of values is 0.10–0.30 cc/g.

The necessary performance of the catalyst can be obtained when the catalyst bed is formed from catalyst carriers shaped as spheres, cylinders, columns or pellets. In the case of an α-alumina base carrier possessing high bulk density and therefore high calorific capacity, in which the reaction starting temperature of the catalyst tends to be high, better effects can be achieved by shaping the carrier into cylindrical form.

Next the manufacturing process of the catalyst of the present invention is described.

α-Alumina and an aluminum compound which yields α-alumina through firing are crushed. Preferably, over 80 wt.% of the crushed material is mixed with less than 20 weight % of a sinter-promoting agent of at least one compound from the group of $SiO_2$, $TiO_2$, $ZrO_2$, CaO, MgO, $B_2O_3$, $MnO_2$, $Cr_2O_3$ and CuO. Further a common organic binding agent can also be added to the mixture as a slurry obtained from this blending and is subjected to spray drying to dry the slurry into highly fluidic granules. The granules thus obtained are molded in a press into the desired shape and size, or a blend of the alumina material with a sinter-promoting agent and an organic binding agent is extruded from an extrusion molding machine and is molded into a desired size.

The molded product, after drying, is fired over a temperature range of 1100° C.–1500° C. at which temperature both alumina and the sinter-promoting agent sinter, yielding the α-alumina carrier of the invention. The adequacy of the total pore volume and the average pore diameter can be verified through measurement by the intrusion porosity.

The palladium component of the catalyst which is supported on the α-alumina carrier of the described pore structure yields a catalyst with the ability to eliminate the harmful components of the exhaust gas, i.e., unburned hydrocarbons and CO and having increased durability and excellent mechanical strength.

In order to form the α-alumina supported palladium catalyst of the invention, any conventional process can be employed. Thus, the α-alumina carrier can be immersed in a solution of a palladium compound and thereafter completed in the conventional manner to achieve the desired catalyst. Suitable palladium compounds employed in the process include the oxides; hydroxide; mineral acid salts such as the halogenide and nitrate salts; complex salts of ammonia, hydrazine and amines; acetate; benzoate, oxalate; and phenolate and mixtures of two or more of the compounds.

After absorption of the palladium compound on the carrier, the catalyst is normally dried and then subjected to a heat treatment or a chemical treatment followed by washing. Washing here includes washing with water and washing with a solution containing an acid, a base or an organic solvent.

The catalyst is dried to eliminate residual solution from the carrier, by removal of excess solution followed by natural drying, drying under heat, drying under reduced pressure or drying under applied pressure.

In the heat treatment of the present catalyst, the palladium compound impregnated in the carrier is totally or partially transformed or aged by heating to an appropriate temperature. If the catalyst is chemically treated rather than heat treated, the palladium compound impregnated in the support is totally or partially transformed into the metallic state or some other form of metal compound by the use of a chemical agent such as a reducing agent.

In the present invention the carrier is employed to support palladium as the catalyst metal, thereby achieving the effects of the present catalyst system to eliminate unburned hydrocarbons and CO, i.e., the harmful components of the exhaust gas, and to diminish the rate of conversion of $SO_2$ into $SO_3$ on the catalyst bed as well as to decrease the volume of the $SO_2$ which is adsorbed as $SO_3$ on the alumina carrier.

The amount of palladium supported on the carrier is not critical in the catalyst of the invention. The desired volume of palladium supported on the carrier may be appropriately selected depending on the life of the auto emission purifying catalyst and the effectiveness of the palladium content contributing to the catalyst activity. Normally, palladium in amounts of 0.3 – 2.0 g/l relative to the catalyst composition is adequate.

Having generally described the invention, a more complete understanding can be obtained by reference to certain specific examples, which are provided herein for purposes of illustration only and are not intended to be limiting unless otherwise specified.

The properties of various samples of the α-alumina carrier are shown in Table 1.

TABLE 1

| Sample Number | 1 | 2 | 3 | 4 | 5 | 6 | 7 | 8 |
|---|---|---|---|---|---|---|---|---|
| Crystalline Form | α | α | α | α | α | γ | γ | α |
| Bulk density g/cc | 1.72 | 1.72 | 1.25 | 0.75 | 0.75 | 0.67 | 0.67 | 0.75 |
| Total pore volume cc/g | 0.13 | 0.12 | 0.10 | 0.50 | 0.50 | 0.65 | 0.65 | 0.50 |
| Specific surface area m²/g | 1.0 | 0.5 | 0.2 | 17.0 | 17.0 | 100.0 | 100.0 | 17.0 |
| Average pore diameter μ | 0.55 | 1.00 | 2.50 | 0.13 | 0.13 | 0.01 | 0.01 | 0.13 |
| Catalytic agent species | Pd | Pd | Pd | Pd | Pd | Pd | Pt | Pt |
| Catalytic agent amount g/l | 1.0 | 1.0 | 1.0 | 1.0 | 0.6 | 1.0 | 1.0 | 1.0 |

In Table 1, sample No. 1 was obtained as follows:

A mixture of α-$Al_2O_3$ (96%), $SiO_2$ (1%), CaO (1%), MgO (1%) and $B_2O_3$ (1%) was wet-crushed in a ball mill. Polyvinyl alcohol (5 parts by weight) and water (20 parts by weight) were added to 100 parts by weight of the dried mixture and the mixture was fully kneaded in a kneader. The mass obtained was extruded into a column shaped mass and cut into pieces. The cut pieces were then subjected to a rolling granulating machine, yielding 3.5 mm grains, which were dried and then fired for 3 hours at 1350° C. in an oxidizing atmopshere, giving a supported catalyst. By this procedure, 1 g/l of palladium was supported on 1 l of the carrier.

Sample No. 2 was obtained similarly from a mixture of α-$Al_2O_3$ (92%), $SiO_2$ (5%) and $ZrO_2$ (3%).

Sample No. 3 was obtained similarly using a cylindrical catalyst carrier of outer diameter 2.5 mm, inner diameter 1.3 mm and length 2.9 mm prepared from a mixture of α-$Al_2O_3$ (97%), $ZrO_2$ (1%), $MnO_2$ (1%) and CuO (1%).

Sample No. 4 was obtained as follows:

A mixture of γ-$Al_2O_3$ and θ-$Al_2O_3$ (99.6%), CaO (0.1%), MgO (0.1%) and the rest impurities was granulated into 3.5 mm grains. The grains were fired at 600°-700° C. for 2 hours, and thereafter, placed in a refractory sheath and further fired at 1100°-1200° C. for 30-60 minutes in a continuous furnace to yield a catalyst support. The catalyst support was composed of α-alumina and consisted of 1 g/l of palladium supported on 1 l of carrier.

Sample No. 5 was also a catalyst of the present invention which was obtained by making a carrier in a manner similar to Sample No. 4. The catalyst consisted of 0.6 g/l of palladium on the support.

In addition to these samples, Sample No. 6 was a control which was obtained by granulating a mixture of α-$Al_2O_3$ and θ-$Al_2O_3$ (99.6%) CaO (0.1%), MgO (0.1%), and the balance impurities into 3.5 mm grains. The grains were baked at 600°-700° C. for 2 hours, thereby yielding a catalyst carrier of γ-$Al_2O_3$ with a grain size of 3.5 mm. In the resulting catalyst, palladium was supported on the carrier in amounts of 1 g/l.

Sample No. 7 was also a control which was obtained by preparing the same carrier as in Sample No. 6, but differed in that platinum was supported on the carrier in an amount of 1 g/l.

Sample No. 8 was also a control which was obtained by supporting platinum (1 g/l) on the same carrier as used in Sample No. 4. The following is a summary of the results obtained from various tests made using these samples.

TEST NO. 1

Figure 1:
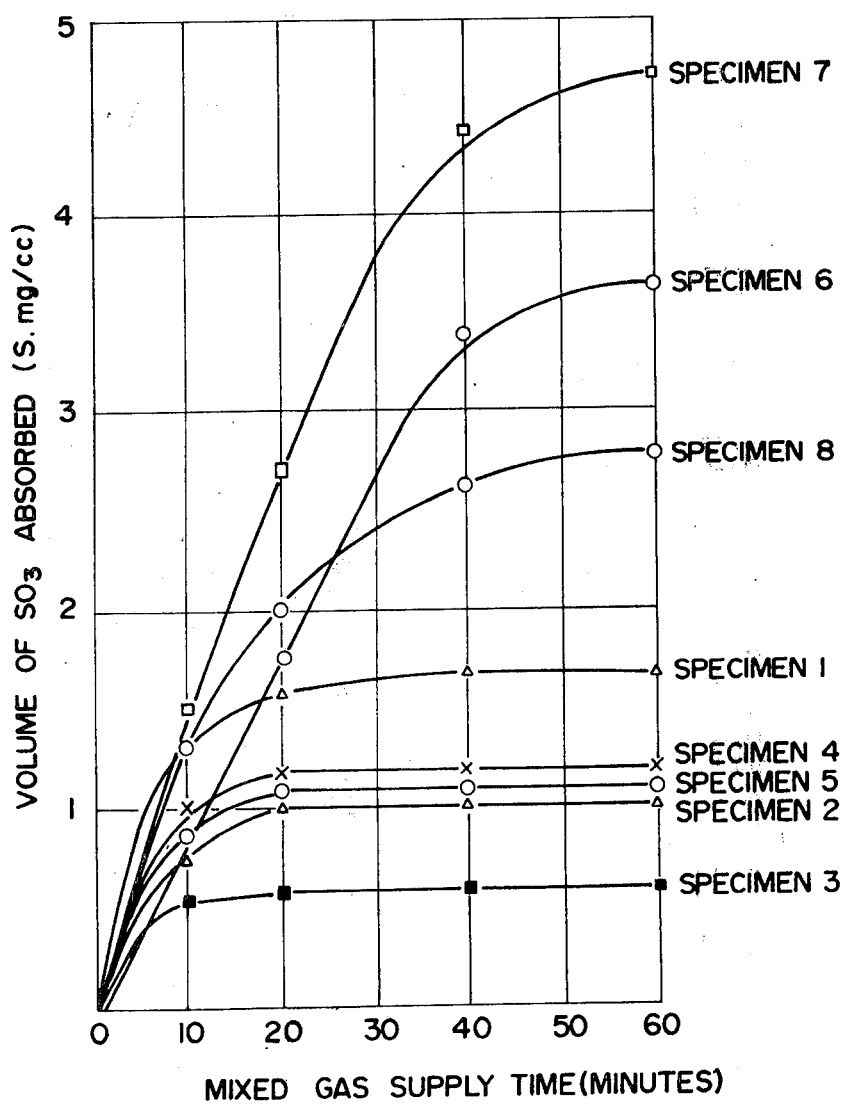
FIG. 1 graphically illustrates the relationship between a mixed gas supply time and the volume of $SO_3$ adsorbed on the carrier, as measured with a catalyst of the present invention and a control sample.

A 10 cc specimen of each sample in Table 1 was held at 400° C. and was continuously subjected to a gas mixture of $SO_2$ (0.4%), $O_2$(2.5%), $C_3H_8$ (0.2%) and the balance $N_2$ at a space velocity of $3 \times 10^4 hr^{-1}$ and a flow rate 5 l/min. The $SO_2$ in the gas was converted to $SO_3$ by the supported metal which constituted the tested catalyst. The adsorbed volume of $SO_3$ as $Al_2(SO_4)$ on the alumina carrier was measured as the sulfur content after a specified lapse of time. The results are shown in FIG. 1.

As is evident from Table 1, Samples No. 4 and No. 8 use the same carrier. Sample No. 8 supports platinum (1.0%), while Sample No. 4 supports the same amount of palladium. Referring now to FIG. 1, it is evident that the volume of sulfur occluded on the carrier is greater in Sample No. 8 which is the platinum containing catalyst. From this comparison it is evident that when platinum is used as the catalyst metal, the yield of $SO_3$ is greater, the carrier attains the $SO_3$ adsorption equilibrium faster and the volume of $SO_3$ adsorption is greater, because platinum exhibits a greater activity for catalytically oxidizing $SO_2$ into $SO_3$ than palladium.

On the other hand, it is also evident that the volume of sulfur which is occluded in the carrier is far greater in Sample No. 6, which is mainly a γ-alumina carrier of pore structure with a total pore volume of 0.65 cc/g, an average pore diameter of 0.01μ and a specific surface area of 100 m²/g containing supported palladium (1.0 g/l) than in Specimen No. 4, which is mainly an α-alumina carrier of pore structure with a total pore volume of 0.50 cc/g, an average pore diameter of 0.13μ and a specific surface area of 17 m²/g which was prepared from a γ-alumina material by baking the same in a reducing atmosphere for two hours at 1100°-1200° C. thereby effecting crystal transformation of γ-alumina, into α-alumina and obtaining a catalyst containing palladium (1.0 g/l) on the carrier. Thus when palladium is supported as the catalyst metal on an alumina carrier, its pore structure brings about a greater difference in the occluded volume of sulfur, and the adsorbed volume of the occluded $SO_3$ is reduced by using a carrier with a large average pore diameter and small specific surface area and a total pore volume.

Sample No. 5 employed the same carrier as Sample No. 2 and contained 0.6 g/l of supported palladium on the carrier. However, compared with Sample No. 4, which contained 1.0 g/l of palladium supported on the same carrier, Sample No. 5 shows that a decrease in the palladium content results in a somewhat decreased adsorption of SO$_3$. However, this effect is minor compared to the influence of the porosity of the carrier on the results obtained.

TEST NO. 2

The crushing strength of each sample in Table 1 was measured, while using a gas mixture which simulated the composition of real auto emissions. Each specimen was checked for its ability to eliminate CO and hydrocarbons before and after the endurance bench test equivalent to a 30,000 km run. The occluded volume of SO$_3$ in test No. 1, once the SO$_3$ adsorption equilibrium was reached by the carrier, and the volume of SO$_3$ occluded on the carrier as a function of sulfur content were measured and are summarized in Table 2.

TABLE 2

| Specimen Number | 1 | 2 | 3 | 4 | 5 | 6 | 7 | 8 |
|---|---|---|---|---|---|---|---|---|
| Crushing strength kg/grain | 23.0 | 30.5 | 7.5 | 5.4 | 5.4 | 7.0 | 7.0 | 5.4 |
| CO conversion ratio (%) | | | | | | | | |
| initial | 100 | 100 | 100 | 100 | 100 | 95 | 100 | 100 |
| durability | 90 | 90 | 93 | 95 | 90 | 60 | 95 | 92 |
| HC conversion ratio (%) | | | | | | | | |
| initial | 96 | 95 | 96 | 95 | 90 | 95 | 90 | 95 |
| durability | 85 | 81 | 92 | 85 | 80 | 40 | 40 | 82 |
| SO$_3$ occlusion as S mg/cc | 1.7 | 1.0 | 0.6 | 1.2 | 1.1 | 3.6 | 4.8 | 2.9 |

As is evident from Table 2, Sample Nos. 1, 2, 3, 4 and 5 of the auto emission purifying catalyst of the present invention, excel in durability for CO and hydrocarbon elimination performance over control Sample Nos. 6 and 7 because of the differences in the porous structure of the carriers. Moreover, Sample No. 8 in spite of its pore structure, which is the same as that of the samples of the present catalysts, occludes more SO$_3$ in the alumina carrier, which proves the excellence of the catalyst of the present invention.

TEST NO. 3

Each specimen in Table 1 was exposed to a gas mixture of SO$_2$ (21-24 ppm), O$_2$ (5%), CO (1.5%), CO$_2$ (14%), C$_3$H$_8$ (500 ppm) and the balance N$_2$ which simulates the composition of a real auto emission gas mixture at a flow rate of 5.2 l/min and a spacial velocity of 3 × 10$^4$hr$^{-1}$ and a catalyst bed temperature of 400° C., whereby the rate of SO$_2$ in the mixture converted to SO$_3$ was measured. The results are shown in Table 3.

TABLE 3

| Specimen No. | 1 | 2 | 3 | 4 | 5 | 6 | 7 | 8 |
|---|---|---|---|---|---|---|---|---|
| Conversion Rate | 12 | 11 | 14 | 10 | 15 | 16 | 38 | 46 |

The palladium-supported catalyst generates less SO$_3$ than the platinum supported catalyst. Thus it is evident that the use of palladium can maintain the desired performance level of eliminating unburned hydrocarbons and CO while maintaining lower conversion rates of SO$_2$ which is formed by oxidation of sulfur in gasoline to SO$_3$ in contrast to similar platinum containing catalysts.

As is evident from the foregoing discussion, the catalyst of the present invention is extremely useful as an auto emission purifying catalyst, because it not only exhibits durable purifying characteristics, but it also has a low rate of SO$_2$-SO$_3$ conversion and a low extent of occlusion of SO$_3$.

Having now fully described this invention, it will be apparent to one of ordinary skill in the art that many changes and modifications can be made thereto without departing from the spirit or scope of the invention as set forth herein.

What is desired as new and intended to be secured by Letters Patent is:

1. An auto emission purification catalyst, comprising: palladium supported on an α-alumina carrier having a total pore volume of 0.05 - 0.50 cc/g and an average pore diameter of 0.05 - 5.0μ.

2. The catalyst of claim 1, wherein the total pore volume of said carrier is in the range of 0.1 - 0.3 cc/g.

3. The catalyst of claim 1, wherein the average pore diameter of said carrier is in the range of 0.1 - 2μ.

4. The catalyst of claim 1, wherein the palladium content on said carrier is in the range of 0.3 - 2.0 g/l.

5. The catalyst of claim 1, wherein said carrier is in the form of cylindrical, columnar or pellet shaped objects.

6. A process of preparing an auto emission purification catalyst, comprising:
   forming an α-alumina carrier having a total pore volume of 0.05 - 0.50 cc/g and an average pore diameter of 0.05-5.0μ; and thereafter supporting palladium on said carrier.

7. The process of claim 6, wherein said palladium is supported in amounts ranging from 0.3 - 2.0 g/l.

8. The process of claim 6, wherein said α-alumina carrier is prepared by:
   (a) crushing α-alumina and an aluminum compound which yields α-alumina upon firing;
   (b) mixing a sinter promoting agent and a binding agent with said crushed mixture of α-alumina and said aluminum compound;
   (c) forming a slurry of said mixture and molding said mixture into the desired shape; and
   (d) sintering said molded material at a temperature of 1100°-1500° C.

9. The process of claim 7, wherein less than 20 weight % of at least one compound selected from the group consisting of SiO$_2$, TiO$_2$, ZrO$_2$, CaO, MgO, B$_2$O$_3$, MnO$_2$, Cr$_2$O$_3$ and CuO is employed as the α-alumina sinter-promoting agent.

10. The process of claim 6, wherein said palladium is supported on said α-alumina carrier by:
   (a) immersing said α-alumina carrier in a solution containing a palladium compound, thereby effectively supporting said compound on said carrier;
   (b) drying said supported palladium compound;
   (c) heat treating said dried supported compound at a temperature of 1350° C. for 3 hours; and then
   (d) washing said treated supported compound.

* * * * *